United States Patent
Shimizu et al.

(10) Patent No.: US 12,027,321 B2
(45) Date of Patent: Jul. 2, 2024

(54) METHOD FOR PRODUCING ELECTRODE FOR ALUMINUM ELECTROLYTIC CAPACITOR

(71) Applicants: NIPPON LIGHT METAL COMPANY, LTD., Tokyo (JP); TOYO ALUMINIUM K.K., Osaka (JP)

(72) Inventors: Yuta Shimizu, Shizuoka (JP); Masahiko Katano, Shizuoka (JP); Toshifumi Taira, Osaka (JP); Kazuya Fujimoto, Osaka (JP); Shinya Sone, Osaka (JP)

(73) Assignees: NIPPON LIGHT METAL COMPANY, LTD., Tokyo (JP); TOYO ALUMINIUM K.K., Tokyo (JP)

( * ) Notice: Subject to any disclaimer, the term of this patent is extended or adjusted under 35 U.S.C. 154(b) by 919 days.

(21) Appl. No.: 16/977,255

(22) PCT Filed: Jan. 16, 2019

(86) PCT No.: PCT/JP2019/001050
§ 371 (c)(1),
(2) Date: Nov. 8, 2020

(87) PCT Pub. No.: WO2019/176267
PCT Pub. Date: Sep. 19, 2019

(65) Prior Publication Data
US 2021/0335554 A1    Oct. 28, 2021

(30) Foreign Application Priority Data
Mar. 16, 2018 (JP) .................................. 2018-049199

(51) Int. Cl.
*H01G 9/00* (2006.01)
*H01G 9/032* (2006.01)
(Continued)

(52) U.S. Cl.
CPC ........... *H01G 9/0029* (2013.01); *H01G 9/032* (2013.01); *H01G 9/045* (2013.01); *H01G 9/048* (2013.01)

(58) Field of Classification Search
None
See application file for complete search history.

(56) References Cited

U.S. PATENT DOCUMENTS 4,113,579 A * 9/1978 Randall, Jr. ............. C25D 11/12
                                                    205/229
4,159,927 A * 7/1979 Bernard ................. C25D 11/06
                                                    205/332
(Continued)

FOREIGN PATENT DOCUMENTS

JP    H02-216811 A    8/1990
JP    H11-54381 A     2/1999
(Continued)

OTHER PUBLICATIONS

Machine Translation, JP 2005347681 A, Morishita Toshikazu, Dec. 15, 2005 (Year: 2005).*
(Continued)

*Primary Examiner* — Scott B Geyer

(57) ABSTRACT

In production of an electrode for an aluminum electrolytic capacitor, a hydrated film is formed onto an aluminum electrode including a porous layer by immersing the aluminum electrode into a first hydration treatment liquid having a temperature of 80° C. or more in a first hydration treatment step (ST1) and thereafter the aluminum electrode is heated in an atmosphere having a temperature of 150° C. or more and 350° C. or less in a dehydration step (ST2). Subsequently, a hydrated film is formed onto the aluminum electrode by immersing the aluminum electrode into a second hydration treatment liquid having a temperature of 80° C. or more in a second hydration treatment step (ST3)
(Continued)

and thereafter chemical formation of the aluminum electrode is performed at 400 V or more and further 600 V or more in a chemical formation step.

10 Claims, 13 Drawing Sheets

(51) Int. Cl.
*H01G 9/045* (2006.01)
*H01G 9/048* (2006.01)

(56) References Cited

U.S. PATENT DOCUMENTS

| | | | | |
|---|---|---|---|---|
| 4,437,945 A | * | 3/1984 | Sells | C25D 11/08 |
| | | | | 205/175 |
| 5,549,989 A | * | 8/1996 | Anani | H01M 10/0562 |
| | | | | 429/306 |
| 6,099,709 A | * | 8/2000 | Tanahashi | C25D 7/0628 |
| | | | | 205/147 |
| 10,923,288 B2 | * | 2/2021 | Shimizu | H01G 9/0036 |
| 11,626,257 B2 | * | 4/2023 | Enoki | H01G 9/0029 |
| | | | | 361/524 |
| 2015/0221443 A1 | * | 8/2015 | Katano | B05D 3/0254 |
| | | | | 427/80 |
| 2019/0371530 A1 | * | 12/2019 | Hemphill | C25D 11/12 |

FOREIGN PATENT DOCUMENTS

| | | | | | |
|---|---|---|---|---|---|
| JP | 2000-3835 | A | | 1/2000 | |
| JP | 2005-347681 | A | | 12/2005 | |
| JP | 2014-57000 | A | | 3/2014 | |
| JP | 5490446 | B2 | | 5/2014 | |
| JP | 2018080373 | A | * | 5/2018 | B05D 3/0254 |

OTHER PUBLICATIONS

WIPO, International Search Report for International Patent Application No. PCT/JP2019/001050, dated Mar. 19, 2019.

* cited by examiner

350/30/350

METHOD FOR PRODUCING ELECTRODE FOR ALUMINUM ELECTROLYTIC CAPACITOR

FIELD

The present invention relates to a method for producing an electrode for an aluminum electrolytic capacitor that performs chemical formation of an aluminum electrode.

BACKGROUND

As a method for producing an electrode for an aluminum electrolytic capacitor used for a medium and high voltage, it has been known that a hydration treatment step (pure water boiling step) of boiling an aluminum foil in pure water is performed before a chemical formation step is performed. By performing the hydration treatment step, electrostatic capacitance after the chemical formation can be increased. This is because a highly crystalline chemical formation film is obtained in the case where pseudo-boehmite and the like in a hydrated film are dehydrated to be converted into the chemical formation film. When the hydrated film is obtained by a usual hydration treatment step alone, the amount and the thickness of the hydrated film are increased by applying longer boiling time and the amount of pseudo-boehmite is also increased in association with this increase. Therefore, in order to obtain the highly crystalline chemical formation film having high electrostatic capacitance, the amount of highly crystalline pseudo-boehmite formed in the hydration treatment step is required to be increased. For this purpose, the boiling time is required to be longer.

However, increase in the thickness and the amount of the hydrated film by elongating the boiling time causes the porous part of the aluminum electrode to be clogged by the hydrated film. When the clogging is generated by the hydrated film, an electrolytic solution is not permeated into the clogged part at the time of subsequent chemical formation. Therefore, the chemical formation film is not properly formed and thus the hydration resistance of the chemical formation film deteriorates. In addition, a surface area is decreased in the clogged part and thus the electrostatic capacitance deteriorates. In particular, when the thickness of a porous layer is 400 μm or more, clogging is likely to be generated in the porous part by boiling and thus elongation of the boiling time for increasing the electrostatic capacitance causes a problem in that the hydration resistance of the chemical formation film is worsened and thus the electrostatic capacitance also deteriorates.

On the other hand, a method for producing an aluminum electrode for an electrolytic capacitor including a step of attaching an organic acid such as malonic acid and fumaric acid to the surface of a hydrated film after a hydration treatment step is developed (Patent Literature 1).

CITATION LIST

Patent Literature

Patent Literature 1: Japanese Patent No. 5490446

SUMMARY

Technical Problem

However, the technique described in Patent Literature 1 is a technique for reducing dissolution of the hydrated film by an organic acid at the time of using a phosphoric acid-based chemical formation liquid in the chemical formation step and is not a technique for increasing the amount of pseudo-boehmite in the hydrated film formed in the hydration treatment step. Therefore, even when the technique described in Patent Document 1 is used, the amount of highly crystalline pseudo-boehmite is required to be increased by applying longer boiling time for obtaining the highly crystalline chemical formation film having high electrostatic capacitance. Consequently, generation of the clogging cannot be reduced.

In consideration of the above problems, an object of the present invention is to provide a method for producing an electrode for an aluminum electrolytic capacitor that can increase the electrostatic capacitance by increasing the amount of highly crystalline pseudo-boehmite without forming a thick hydrated film.

Solution to Problem

In order to solve the above problems, a method for producing an anode foil for the aluminum electrolytic capacitor according to the present invention comprises:

a first hydration treatment step of forming a hydrated film onto an aluminum electrode including a porous layer by immersing the aluminum electrode into a first hydration treatment liquid having a temperature of 80° C. or more;

a dehydration step of heating the aluminum electrode in an atmosphere having a temperature of 150° C. or more and 350° C. or less after the first hydration treatment step;

a second hydration treatment step of immersing the aluminum electrode into a second hydration treatment liquid having a temperature of 80° C. or more after the dehydration step; and a chemical formation step of performing chemical formation of the aluminum electrode after the second hydration treatment step.

In the present invention, the dehydration step of heating the aluminum electrode in an atmosphere having a temperature of 150° C. or more and 350° C. or less is performed after the first hydration treatment step and thereafter the second hydration treatment step is performed. Therefore, the ratio of attached water eliminated at about 100° C. is decreased and the ratio of crystal water eliminated at 350° C. or more is increased. Consequently, the amount of highly crystalline pseudo-boehmite can be increased without forming a thick hydrated film and thus the crystallinity of the chemical formation film can be improved. Therefore, the electrostatic capacitance can be increased. In addition, the hydrated film is not required to be formed in a thick thickness and thus the clogging of the porous layer can be reduced. Therefore, deterioration in the hydration resistance of the chemical formation film due to the clogging and deterioration in the electrostatic capacitance due to the clogging can be reduced.

The application of the present invention is particularly effective in the case where the chemical formation of the aluminum electrode is performed at a chemical formation voltage of 400 V or more in the chemical formation step. The application of the present invention is more effective in the case where the chemical formation of the aluminum electrode is performed at a chemical formation voltage of 600 V or more in the chemical formation step. In the case of high chemical formation voltage, the clogging of the porous layer is likely to be generated because the hydrated film is required to be formed in a thick thickness. Therefore, the application of the present invention is more effective in the case where the chemical formation voltage is 400 V or more and further 600 V or more.

In the present invention, an embodiment is provided in which the aluminum electrode is a porous aluminum electrode formed by laminating the porous layers made of sintered layers of aluminum powder and having a thickness of 200 μm to 50000 μm per layer onto a core material. The aluminum electrode having such a constitution allows the aluminum electrode to provide high electrostatic capacitance compared with the case where an etched foil is used as an aluminum electrode even when the chemical formation voltage is 400 V or more. The surface of the porous layer has high reactivity with boiling pure water compared with the surface of the etched foil and thus the clogging at the surface tends to occur. Therefore, the application of the present invention is effective.

In the present invention, an embodiment is provided in which the first hydration treatment liquid and the second hydration treatment liquid have a pH of 5.0 or more and 9.0 or less.

In the present invention, an embodiment is provided in which, at least one hydration treatment liquid out of the first hydration treatment liquid and the second hydration treatment liquid is made by blending a hydration inhibiting agent into water. According to such an embodiment, the hydration treatment liquid includes the hydration inhibiting agent and thus, different from the pure water boiling in which the aluminum electrode is immersed into boiling pure water, the progressing rate of the hydration reaction can be adequately reduced. Therefore, the clogging in the porous layer due to an excessive hydrated film can be reduced. In addition, the generation rate of bubbles by the hydration reaction is slow and thus a state where the hydration reaction is difficult to be progressed in the deep part of the porous layer is less likely to occur.

In the present invention, an embodiment is provided in which the hydration inhibiting agent is an organic hydration inhibiting agent having a carbon number of 3 or more. As the hydration inhibiting agent, inorganic hydration inhibiting agents including boric acid or the salts thereof and organic hydration inhibiting agents may be used. The organic hydration inhibiting agent has higher hydration inhibition effect than that of the inorganic hydration inhibiting agent. Therefore, in the present invention, the hydration inhibiting agent is preferably an organic hydration inhibiting agent having a carbon number of 3 or more.

In the present invention, an embodiment is provided in which the hydration inhibiting agent is a sugar having a carbon number of 3 or more or a sugar alcohol having a carbon number of 3 or more. In this case, for example, the hydration inhibiting agent is any one of ribulose, xylulose, ribose, arabinose, xylose, lyxose, deoxyribose, psicose, fructose, sorbose, tagatose, allose, altrose, glucose, mannose, gulose, idose, galactose, talose, fucose, fuculose, rhamnose, sedoheptulose, mannitol, sorbitol, xylitol, sucrose, lactulose, lactose, maltose, trehalose, cellobiose, lactitol, maltitol, nigerose, raffinose, maltotriose, melezitose, stachyose, acarbose, and amylose.

In the present invention, an embodiment is provided in which the hydration inhibiting agent is an organic acid having a carbon member of 3 or more or a salt thereof. In this case, for example, the organic acid is any one of dodecanoic acid, benzoic acid, propanedioic acid, butanedioic acid, (E)-2-butenedioic acid, pentanedioic acid, hexanedioic acid, decanedioic acid, dodecanedioic acid, 2-hydroxypropane-1, 2,3-tricarboxylic acid, and (E)-1-propene-1,2,3-tricarboxylic acid.

In the present invention, an embodiment is provided in which, in the dehydration step, the aluminum electrode is heated while pressed by first members in a thickness direction of the aluminum electrode. According to such an embodiment, generation of a state where the aluminum electrode is warped in the dehydration step and the like can be reduced. In this case, the first members are preferably heated at a temperature of 150° C. or more and 350° C. or less at the time of performing the dehydration step. According to such an embodiment, the aluminum electrode can be efficiently heated.

In the present invention, an embodiment is provided in which, in the chemical formation step, a plurality of times of the chemical formation treatment are performed and, between any of the times of the chemical formation treatment, a heat press step of heating the aluminum electrode while pressing by second members in a thickness direction of the aluminum electrode is performed. According to such an embodiment, generation of a state where the aluminum electrode is warped in the chemical formation step can be reduced. In this case, at the time of performing the heat press step, the second members are preferably heated at a temperature of 350° C. or more and 600° C. or less. According to such an embodiment, the aluminum electrode can be efficiently heated.

Advantageous Effects of Invention

In the present invention, the dehydration step of heating the aluminum electrode in an atmosphere having a temperature of 150° C. or more and 350° C. or less is performed after the first hydration treatment step and thereafter the second hydration treatment step is performed. Consequently, the amount of highly crystalline pseudo-boehmite can be increased without forming a thick hydrated film and thus the crystallinity of the chemical formation film can be improved. Therefore, the electrostatic capacitance can be increased. In addition, the hydrated film is not required to be formed in a thick thickness and thus the clogging of the porous layer can be reduced. Therefore, deterioration in the hydration resistance of the chemical formation film due to the clogging and deterioration in the electrostatic capacitance due to the clogging can be reduced.

DESCRIPTION OF EMBODIMENTS

In the present invention, for producing the electrode for the aluminum electrolytic capacitor, the surface of the aluminum electrode is subjected to the chemical formation to produce the electrode for the aluminum electrolytic capacitor. In the following description, the case where the porous aluminum electrode formed by laminating the porous layer made by sintering the aluminum powder onto both surfaces of the aluminum core material is used as the aluminum electrode and such a porous aluminum electrode is subjected to the chemical formation will be mainly described. Hereinafter, after the structure of the aluminum electrode is described, the chemical formation method will be described.

(Constitution of Aluminum Electrode)

Figure 1A:
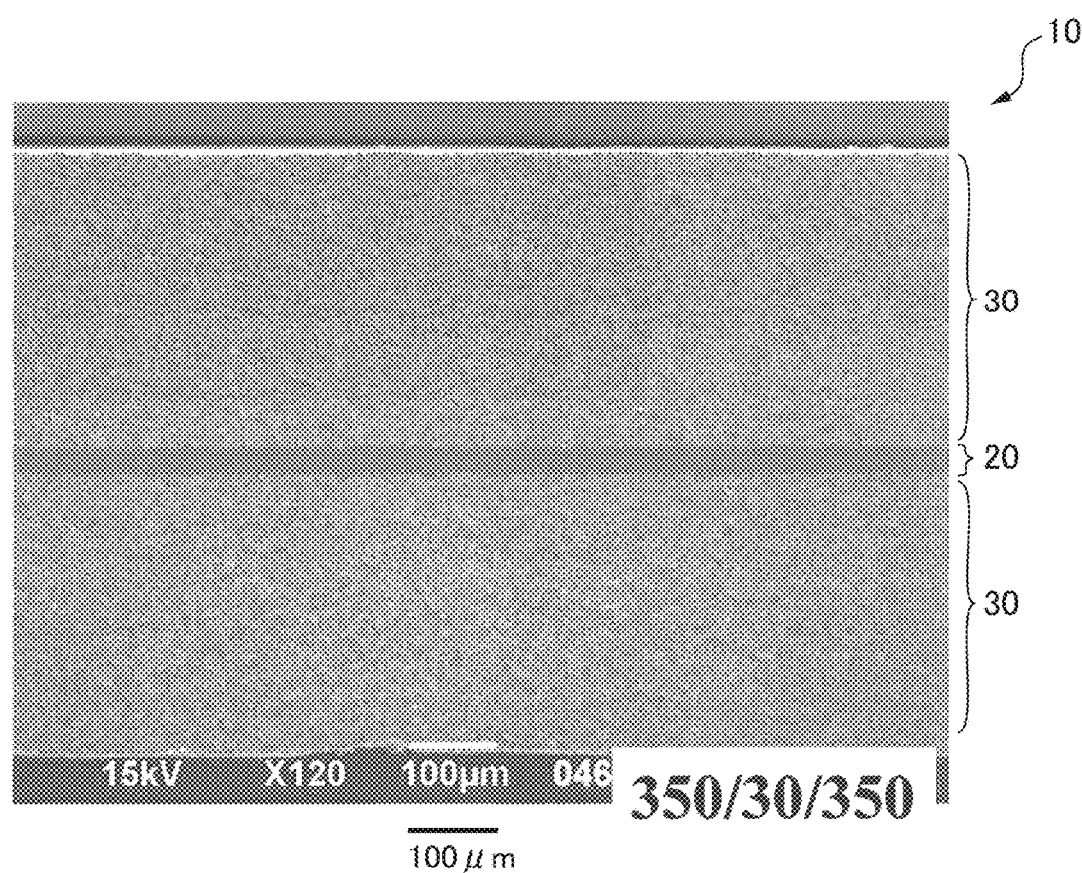
FIG. 1 includes explanatory views illustrating a sectional structure of an aluminum electrode to which the present invention is applied.
Figure 1B:
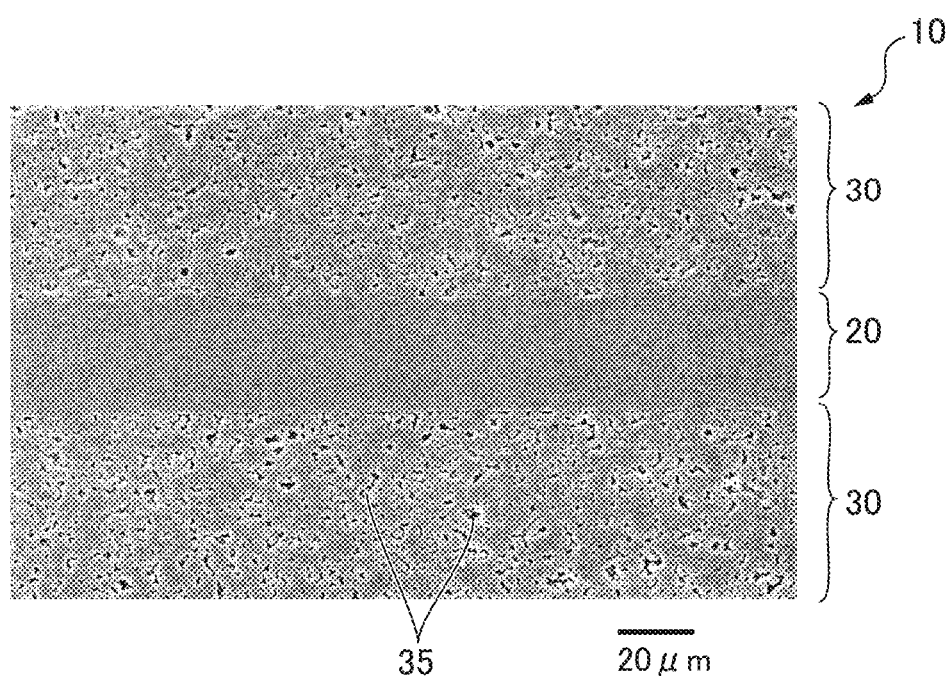
Figure 2:
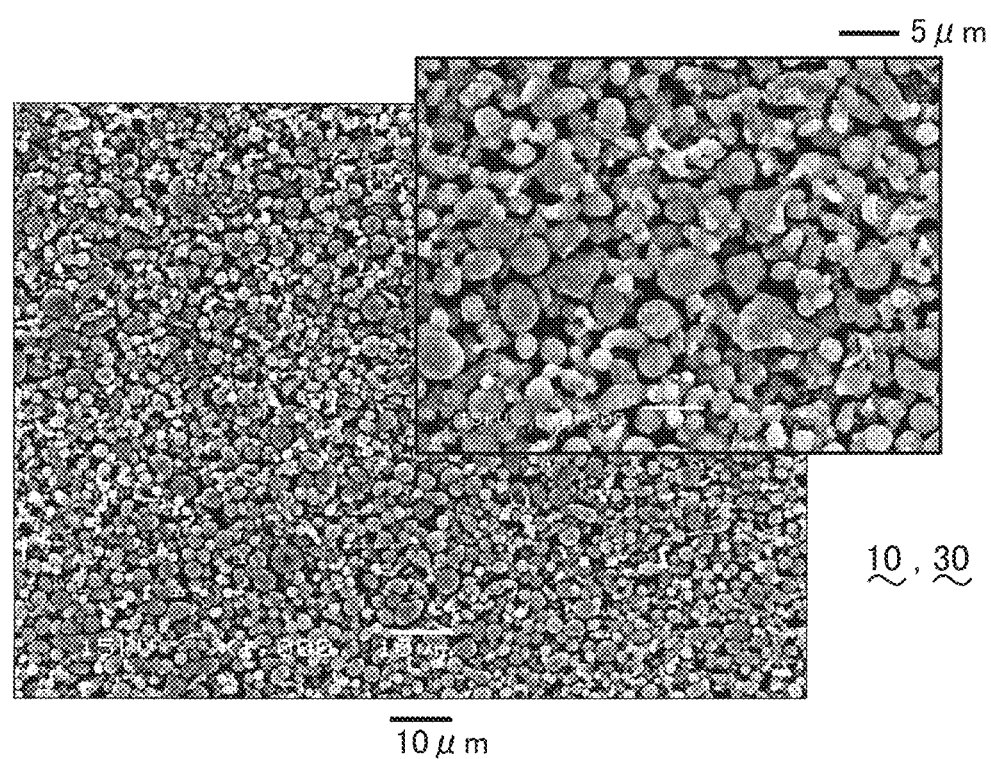
FIG. 2 includes photographs taken by magnifying the surface of the aluminum electrode illustrated in FIG. 1 with an electron microscope.

FIG. 1 includes explanatory views illustrating a sectional structure of an aluminum electrode to which the present invention is applied. FIGS. 1A and 1B are photographs taken by magnifying the cross section of the aluminum electrode at 120 times with an electron microscope and a photograph taken by magnifying the vicinity of the core material of the aluminum electrode at 600 times with the electron microscope, respectively. FIG. 2 includes photographs taken by magnifying the surface of the aluminum electrode illustrated in FIG. 1 with the electron microscope. Here, FIG. 2 includes a photograph magnifying the surface of the porous aluminum electrode at 1000 times and a photograph magnifying the surface at 3000 times.

The aluminum electrode 10 illustrated in FIG. 1 and FIG. 2 has the porous layer 30 and the porous layer 30 is a sintered layer made by sintering the aluminum powder or an etching layer. In the present embodiment, the aluminum electrode 10 is prepared by laminating a sintered layer made by sintering the aluminum powder as the porous layer 30 on the core part made of the aluminum core material 20. In the present embodiment, the aluminum electrode 10 has the porous layers 30 on both surfaces of the aluminum core material 20.

The aluminum core material 20 has a thickness of 10 μm or more and 50 μm or less. In FIG. 1, the aluminum electrode 10 using the aluminum core material 20 having a thickness of about 30 μm is illustrated. The thickness of the porous layer 30 per layer (per one surface) is, for example, 200 μm or more and 50000 μm or less. FIG. 1 illustrates the aluminum electrode 10 in which the porous layers 30 having a thickness of about 350 μm are formed on both surfaces of the aluminum core material 20 having a thickness of 30 μm. As the thickness of the porous layer 30 becomes thicker, the electrostatic capacitance increases and thus thicker porous layer 30 is preferable. Therefore, the thickness of the porous layer 30 is preferably 300 μm or more per layer. On the other hand, the porous layer 30 having a thick thickness tends to cause break in the production process. Therefore, the thickness of the porous layer 30 is preferably 2000 μm or less.

The porous layer 30 may be formed on one side of the aluminum core material 20 or may be formed on both sides of the aluminum core material 20. When the porous layers 30 are formed on both sides, the porous layers 30 are preferably symmetrically disposed by sandwiching the aluminum core material 20. When the porous layers 30 are formed on both sides, the thickness of the porous layer 30 on one side is ⅓ or more relative to the thickness of the entire aluminum electrode 10 including the thickness of the aluminum core material 20.

The aluminum core material 20 preferably has an iron content of less than 1000 ppm by mass and a silicon content of 10 ppm by weight or more and 5000 ppm by weight or less. The porous layer 30 is, for example, a layer made by sintering the aluminum powder having an iron content of less than 1000 ppm by mass and a silicon content of 10 ppm by weight or more and 3000 ppm by weight or less and the aluminum powder is sintered, while the pores 35 are being retained, with each other. In addition, when the aluminum core material 20 and the porous layer 30 include one or more of copper, manganese, magnesium, chromium, zinc, titanium, vanadium, gallium, nickel, boron, and zirconium, the content of each of these elements is 100 ppm by weight or less and the remnant is unavoidable metals and aluminum.

The shape of the aluminum powder is not particularly limited and any of a substantially spherical shape, an indeterminate shape, a scaly shape, a short fiber shape, and the like can be suitably used. In particular, in order to maintain the pores between the aluminum powders, the powder composed of substantially spherical particles is preferable. The average particle diameter of the aluminum powder in the present embodiment is 1 μm or more and 10 μm or less. Therefore, the surface area can be effectively expanded. Here, when the average particle diameter of the aluminum powder is less than 1 μm, the gap between the aluminum powders is excessively narrow and thus ineffective parts that do not function as the electrode or the like increase, whereas when the average particle diameter of the aluminum powder is more than 10 μm, the gap between the aluminum powder is excessively wide and thus enlargement of the surface area is insufficient. In other words, when the average particle diameter of the aluminum powder is less than 1 μm, the pores 35 between the aluminum powders are buried to reduce the electrostatic capacitance when the chemical formation film having a film withstand voltage of 400 V or more is formed. On the other hand, when the average particle diameter is more than 10 μm, the pores 35 become excessively large and thus significant improvement in the electrostatic capacitance is not expected. Therefore, when the thick chemical formation film having a film withstand voltage of 400 V or more is formed on the aluminum electrode 10, the average particle diameter of the aluminum powder used for the porous layer 30 is 1 μm or more and 10 μm or less and preferably 2 μm or more and 10 μm or less. As the average particle diameter of the aluminum powder in the present embodiment, particle size distribution in volume basis is measured by a laser diffraction method. The average particle diameter of the powder after sintering is measured by observing the cross section of the sintered body with a scanning electron microscope. For example, although the powder after sintering is in a state where a part of the powder after sintering is melted or the powders are connected to each other, a part having a substantially circular shape can be regarded as approximately particle shape. A volume based particle size distribution is calculated from the number based particle size distribution to determine the average particle diameter. Here, the average particle diameter before the sintering and the average particle diameter after the sintering determined above are substantially the same.

In the present embodiment, when the aluminum electrode 10 is used as the anode of an aluminum electrolytic capacitor, the chemical formation film is formed on the porous layer 30. At that time, when the part of the aluminum core material 20 exposed from the porous layer 30 exists, the chemical formation film is also formed on the aluminum core material 20.

(Constitution of Aluminum Electrolytic Capacitor)

In order to produce the aluminum electrolytic capacitor using the aluminum electrode 10 after the chemical formation (the electrode for the aluminum electrolytic capacitor) of the present embodiment, for example, a capacitor element is formed by laminating the anode foil made of the aluminum electrode 10 after the chemical formation (the electrode for the aluminum electrolytic capacitor) and a cathode foil with a separator interposed between the anode and the cathode. Subsequently, the capacitor element is impregnated with an electrolytic solution (paste). Thereafter, the capacitor element including the electrolytic solution is placed in an outer case and the case is sealed with a sealing body.

When a solid electrolyte is used instead of the electrolytic solution, a solid electrolyte layer is formed on the surface of the anode foil made of the aluminum electrode 10 after chemical formation (the electrode for the aluminum electrolytic capacitor) and thereafter a cathode layer is formed on the surface of the solid electrolyte layer. Thereafter, the obtained product is exteriorized with a resin or the like. In this process, an anode terminal to be electrically connected to the anode and a cathode terminal to be electrically connected to the cathode layer are provided. In this case, a plurality of pieces of anode foil may be laminated.

As the aluminum electrode 10, a structure in which the porous layer 30 is laminated onto the surface of the rod-like aluminum core material 20 may be employed in some cases. In order to produce the aluminum electrolytic capacitor using such an aluminum electrode 10, for example, a solid electrolyte layer is formed on the surface of the anode made of the aluminum electrode 10 after chemical formation (the electrode for the aluminum electrolytic capacitor) and thereafter a cathode layer is formed on the surface of the solid electrolyte layer. Thereafter, the obtained product is exteriorized with a resin or the like. In this process, an anode terminal to be electrically connected to the anode and a cathode terminal to be electrically connected to the cathode layer are provided.

(Method for Producing Aluminum Electrode 10)

Figure 3:
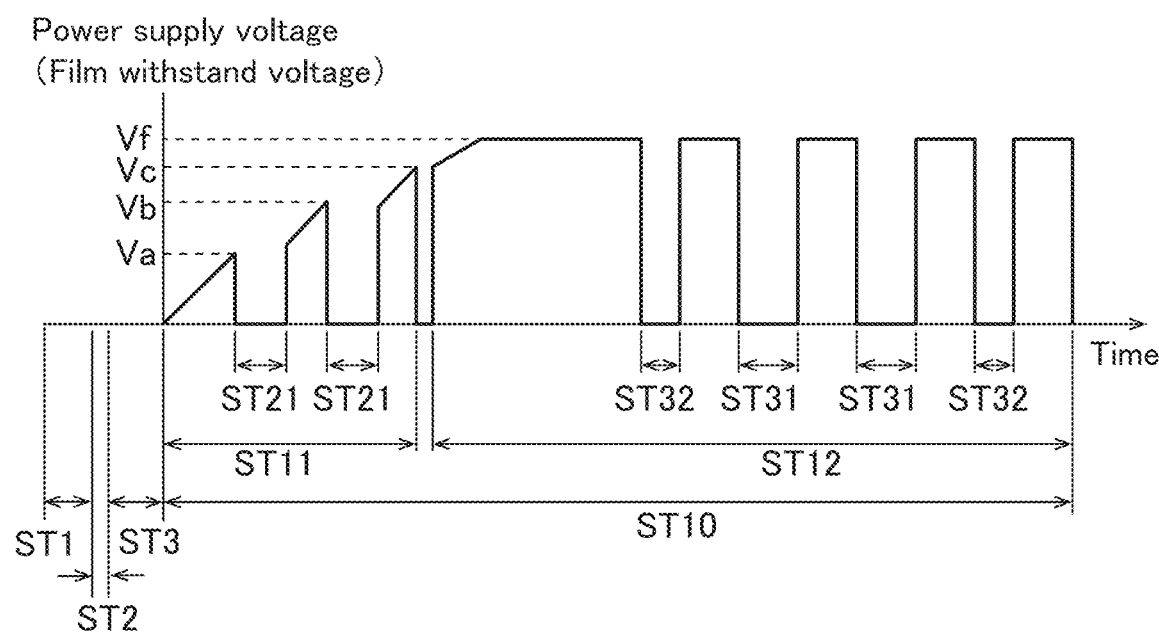
FIG. 3 is an explanatory view illustrating a method for producing an electrode for an aluminum electrolytic capacitor to which the present invention is applied.
Figure 4:
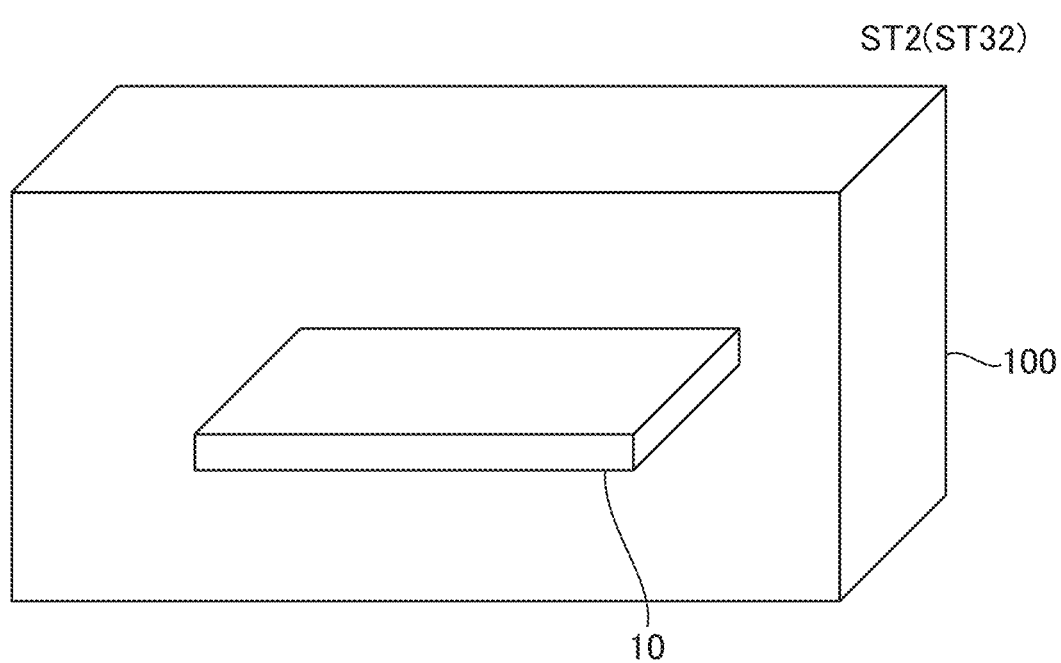
FIG. 4 is an explanatory view of a dehydration step illustrated in FIG. 3.

FIG. 3 is an explanatory view illustrating a method for producing the electrode for an aluminum electrolytic capacitor to which the present invention is applied. FIG. 4 is an explanatory view of the dehydration step ST2 illustrated in FIG. 3.

In the method for producing the anode foil for the aluminum electrolytic capacitor according to the present invention, as illustrated in FIG. 3, in the first hydration treatment step ST1, the hydrated film is formed on the aluminum electrode 10 by immersing the aluminum electrode 10 including the porous layer into the first hydration treatment liquid having a temperature of 80° C. or more.

Subsequently, in the dehydration step ST2, the aluminum electrode 10 is heated in an atmosphere having a temperature of 150° C. or more and 350° C. or less. In the dehydration step ST2, for example, the aluminum electrode 10 is heated in a heat treatment furnace 100 as illustrated in FIG. 4. The atmosphere in the heat treatment furnace may be any one of an air atmosphere, an inert gas atmosphere, and a water vapor atmosphere.

Subsequently, in the second hydration treatment step ST3 illustrated in FIG. 3, the hydrated film is formed on the aluminum electrode 10 by immersing the aluminum electrode 10 into the second hydration treatment liquid having a temperature of 80° C. or more.

Subsequently, in the chemical formation step ST10, the chemical formation of the aluminum electrode 10 is performed. In the present embodiment, the chemical formation of the aluminum electrode is performed at a chemical formation voltage of 400 V or more and further 600 V or more.

In the present embodiment, the first hydration treatment liquid and the second hydration treatment liquid have a pH of 5.0 or more and 9.0 or less. In the present embodiment, pure water heated to a temperature of 80° C. or more is used as the first hydration treatment liquid and the second hydration treatment liquid. As one of or both of the first hydration treatment liquid and the second hydration treatment liquid, treatment water in which the hydration inhibiting agent is blended in pure water may be used and such treatment water may be heated to a temperature of 80° C. or more to use.

As the hydration inhibiting agent, inorganic hydration inhibiting agents including boric acid or the salts thereof and inorganic hydration inhibiting agents may be used. However, the organic hydration inhibiting agent has higher hydration inhibition effect than that of the inorganic hydration inhibiting agent and thus an organic hydration inhibiting agent having a carbon number of 3 or more is preferably used in the present embodiment.

As the organic hydration inhibiting agent, a sugar having a carbon number of 3 or more or a sugar alcohol having a carbon number of 3 or more may be used as the organic hydration inhibiting agent. Such an organic hydration inhibiting agent is, for example, any one of ribulose, xylulose, ribose, arabinose, xylose, lyxose, deoxyribose, psicose, fructose, sorbose, tagatose, allose, altrose, glucose, mannose, gulose, idose, galactose, talose, fucose, fuculose, rhamnose, sedoheptulose, mannitol, sorbitol, xylitol, sucrose, lactulose, lactose, maltose, trehalose, cellobiose, lactitol, maltitol, nigerose, raffinose, maltotriose, melezitose, stachyose, acarbose, and amylose.

As the organic hydration inhibiting agent, an organic acid having a carbon member of 3 or more or the salt thereof may be used as the organic hydration inhibiting agent. Such an organic hydration inhibiting agent is, for example, any one of dodecanoic acid, benzoic acid, propanedioic acid, butanedioic acid, (E)-2-butenedioic acid, pentanedioic acid, hexanedioic acid, decanedioic acid, dodecanedioic acid, 2-hydroxypropane-1,2,3-tricarboxylic acid, and (E)-1-propene-1,2,3-tricarboxylic acid.

In the chemical formation step ST10 illustrated in FIG. 3, a constant current chemical formation step ST11 in which the power supply voltage reaches the chemical formation voltage Vf is performed and thereafter a constant voltage chemical formation step ST12 in which the power source voltage is maintained at the chemical formation voltage Vf is performed.

In the constant current chemical formation step ST11, the chemical formation is preferably suspended and a phosphoric acid immersion step for immersing the aluminum electrode into an aqueous solution containing phosphate ions is preferably performed one or more times. In the phosphoric acid immersion step, the aluminum electrode is immersed in a phosphoric acid aqueous solution having a liquid temperature of 40° C. or more and 80° C. or less and a specific resistance measured at 60° C. of 0.1 Ωm or more and 5 Ωm or less for a period of 3 minutes or more and 30 minutes or less. According to such a phosphoric acid immersion step, the precipitated aluminum hydroxide in the chemical formation step can be efficiently removed and the subsequent generation of aluminum hydroxide can be reduced. Therefore, the residual chemical formation liquid inside the pores of the porous layer can be reduced. In addition, phosphate ions can be taken into the chemical formation film by the phosphoric acid immersion step and thus the stability of the chemical formation film such as being possible to improve durability to immersion in boiling water or acidic solution can be effectively improved.

In the constant voltage chemical formation step ST12, a plurality of times of the chemical formation are performed and heat treatment (thermal depolarization treatment) or phosphoric acid immersion (in-liquid depolarization) is performed in between the chemical formation and the chemical formation. In FIG. 3, the case where, in the course of the constant voltage chemical formation step ST12, two times of the heat treatment (thermal depolarization treatment ST32) and two times of the phosphoric acid immersion (in-liquid depolarization treatment ST31) are performed is illustrated. In the thermal depolarization treatment ST32, for example, the aluminum electrode 10 is heated in the heat treatment furnace 100 as similar to the dehydration step ST2 illustrated in FIG. 4. The treatment temperature at this time is, for example, 350° C. or more and 600° C. or less and the treatment time is 2 minutes or more and 10 minutes or less. The atmosphere in the heat treatment furnace 100 may be any one of an air atmosphere, an inert gas atmosphere, and a water vapor atmosphere. In the in-liquid depolarization treatment ST31, for example, the aluminum electrode 10 is immersed in a phosphoric acid aqueous solution having a concentration of 20% by mass or more and 30% by mass or less for 5 minutes or more and 15 minutes or less depending on the film withstand voltage under conditions of a liquid temperature of 60° C. or more and 70° C. or less. Here, in the in-liquid depolarization treatment, voltage is not applied to the aluminum electrode 10.

In the chemical formation step ST10 illustrated in FIG. 3, for example, an aqueous solution in which ammonium adipate is dissolved in pure water (the first chemical formation liquid) and an aqueous solution in which ammonium borate is dissolved in pure water (the second chemical formation liquid) are used.

More specifically, in the chemical formation step ST10, first, the chemical formation is performed until the power supply voltage reaches Va in the first chemical formation liquid in the constant current chemical formation step ST11 and thereafter the aluminum electrode 10 is washed with water. The aluminum electrode 10 is immersed into the phosphoric acid aqueous solution for 5 minutes in the phosphoric acid immersion step ST21. Subsequently, the aluminum electrode 10 is washed with water. Subsequently, the chemical formation is performed until the power supply voltage reaches Vb in the first chemical formation liquid in the constant current chemical formation step ST11 and thereafter the aluminum electrode 10 is washed with water. The aluminum electrode 10 is immersed into the phosphoric acid aqueous solution for 5 minutes in the phosphoric acid immersion step ST21. Subsequently, the aluminum electrode 10 is washed with water. Subsequently, the chemical formation is performed until the power supply voltage reaches Vc in the first chemical formation liquid and thereafter the aluminum electrode 10 is washed with water. Subsequently, the chemical formation is performed until the power supply voltage reaches Vf (the chemical formation voltage) in the second chemical formation liquid. Subsequently, under the condition in which the power supply voltage is Vf, the constant voltage chemical formation step ST12 of the aluminum electrode 10 is performed in the second chemical formation liquid.

Here, instead of the method illustrated in FIG. 4, the first chemical formation liquid may be used in the constant current chemical formation step ST11 and the second chemical formation liquid may be used in the constant voltage chemical formation step ST12.

(Description of Heat Press Step)

Figure 5:
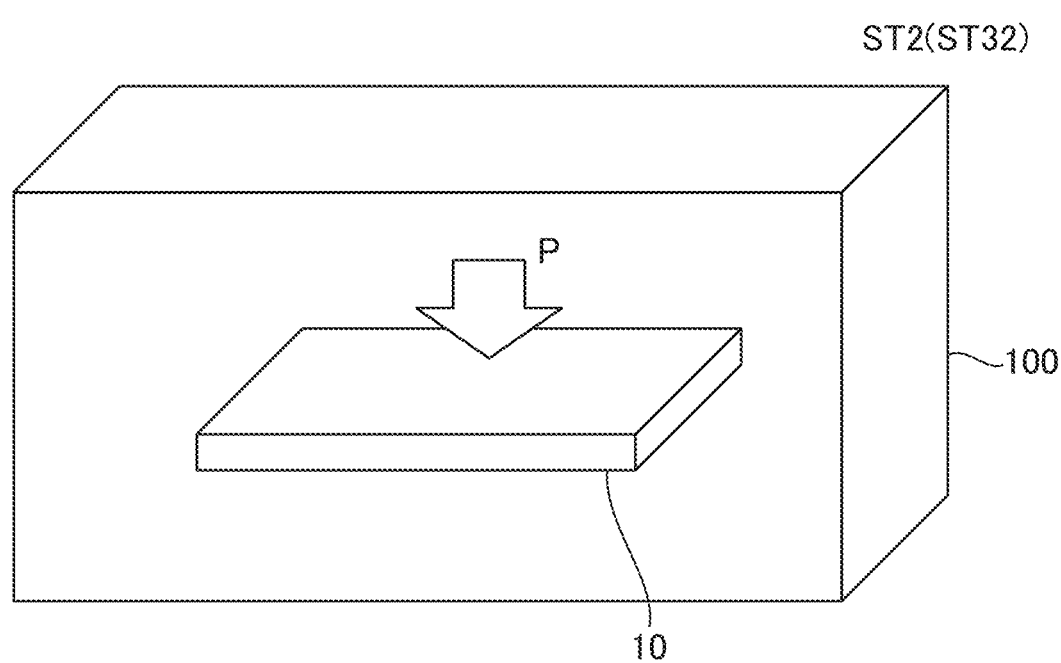
FIG. 5 is an explanatory view of a heat press step performed in the dehydration step in the method for producing the electrode for an aluminum electrolytic capacitor to which the present invention is applied.
Figure 6:
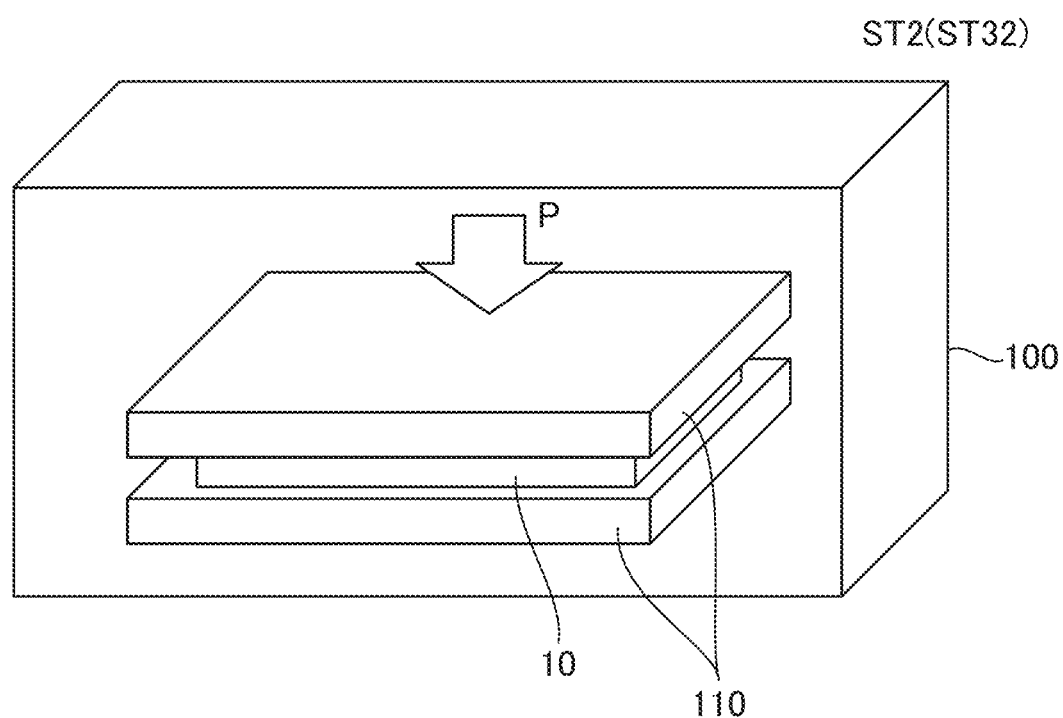
FIG. 6 is an explanatory view of a specific example 1 of the heat press step illustrated in FIG. 5.
Figure 7:
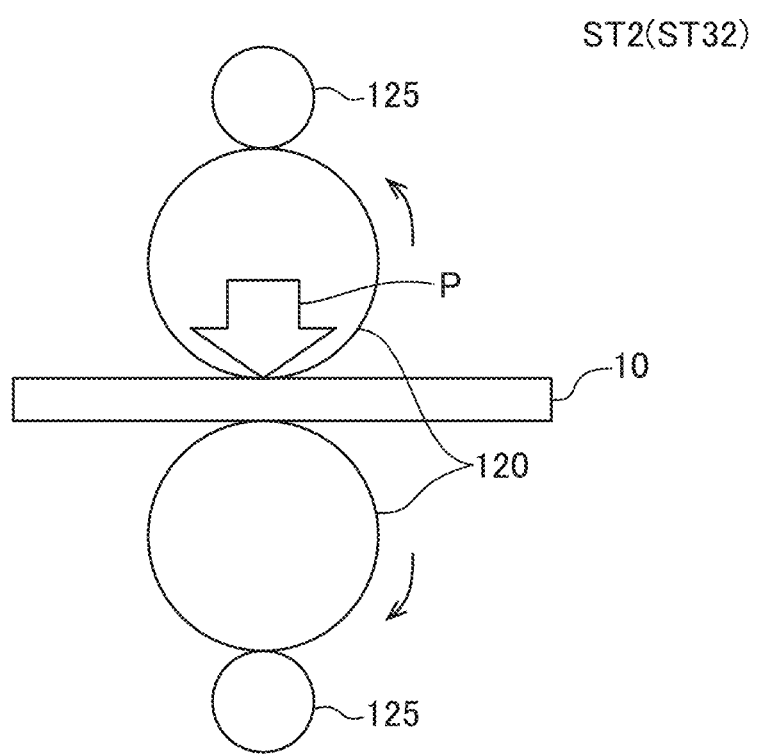
FIG. 7 is an explanatory view of a specific example 2 of the heat press step illustrated in FIG. 5.

FIG. 5 is an explanatory view of the heat press step performed in the dehydration step ST2 in the method for producing the electrode for an aluminum electrolytic capacitor to which the present invention is applied. FIG. 6 is an explanatory view of the specific example 1 of the heat press step illustrated in FIG. 5. FIG. 7 is an explanatory view of the specific example 2 of the heat press step illustrated in FIG. 5.

In the production method described with reference to FIG. 3, in the dehydration step ST2, the aluminum electrode 10 may be heated in the heat treatment furnace 100 while pressing in the thickness direction of the aluminum electrode 10 at pressure P as illustrated in FIG. 5. According to such a heat press step, generation of a state where the aluminum electrode 10 is warped in the dehydration step ST2 or the like can be reduced. In other words, at the time of performing the dehydration step ST2 after performing the first hydration treatment step ST1, the aluminum electrode 10 may be warped and thus dimensional accuracy may be worsened. However, performing the heat press step in the dehydration step ST2 allows the warp of the aluminum electrode 10 to be reduced. Therefore, when the aluminum electrode 10 is subjected to the chemical formation after the aluminum electrode 10 is cut into a predetermined dimension, high dimensional accuracy of the aluminum electrode 10 can be maintained.

For performing the heat press step illustrated in FIG. 5, for example, a method for placing the aluminum electrode 10 between two plate-like members 110 (first members) and applying pressure P to the aluminum electrode 10 from at least one of the two members 110 as illustrated in FIG. 6 may be employed. At this time, when the dehydration step ST2 is performed using the two members 110, the aluminum electrode 10 can be efficiently heated by heating the members 110 to a temperature of 150° C. or more and 350° C. or less.

As illustrated in FIG. 7, the aluminum electrode 10 may be passed through between two roller-like members 120 (first members). Here, respective two members 120 are rotated in the opposite direction to each other by driving rollers 125. When the dehydration step ST2 is performed using the two members 120, the aluminum electrode 10 can be efficiently heated by heating the members 110 to a temperature of 150° C. or more and 350° C. or less.

In the thermal depolarization treatment ST32 described with reference to FIG. 3, the aluminum electrode 10 is preferably heated while pressing in the thickness direction of the aluminum electrode 10 as similar to the dehydration step ST2 illustrated in FIG. 5. According to such a heat press step, generation of a state where the aluminum electrode 10 is warped in the thermal depolarization treatment ST32 or the like can be reduced. In other words, when the chemical formation step ST10 and the thermal depolarization treatment ST32 are performed, the aluminum electrode 10 may be warped. However, performing the heat press step allows the warp of the aluminum electrode 10 to be reduced.

Similar to the dehydration step ST2, for performing the heat press step illustrated in FIG. 5 in the thermal depolarization treatment ST32, for example, the aluminum electrode 10 is placed between two plate-like members 110 (second members) and pressure P is applied to the aluminum electrode 10 from at least one of the two members 110 as illustrated in FIG. 6. When the thermal depolarization treatment ST32 is performed using the two members 110, the aluminum electrode 10 can be efficiently heated by heating the members 110 to a temperature of 350° C. or more and 600° C. or less.

As illustrated in FIG. 7, the aluminum electrode 10 may be passed through between two roller-like members 120 (second members). Here, respective two members 120 are rotated in the opposite direction to each other by driving rollers 125. When the thermal depolarization treatment ST32 is performed using the two members 120, the aluminum electrode 10 can be efficiently heated by heating the members 110 to a temperature of 350° C. or more and 600° C. or less.

(Analysis Results and the Like)

Figure 8:
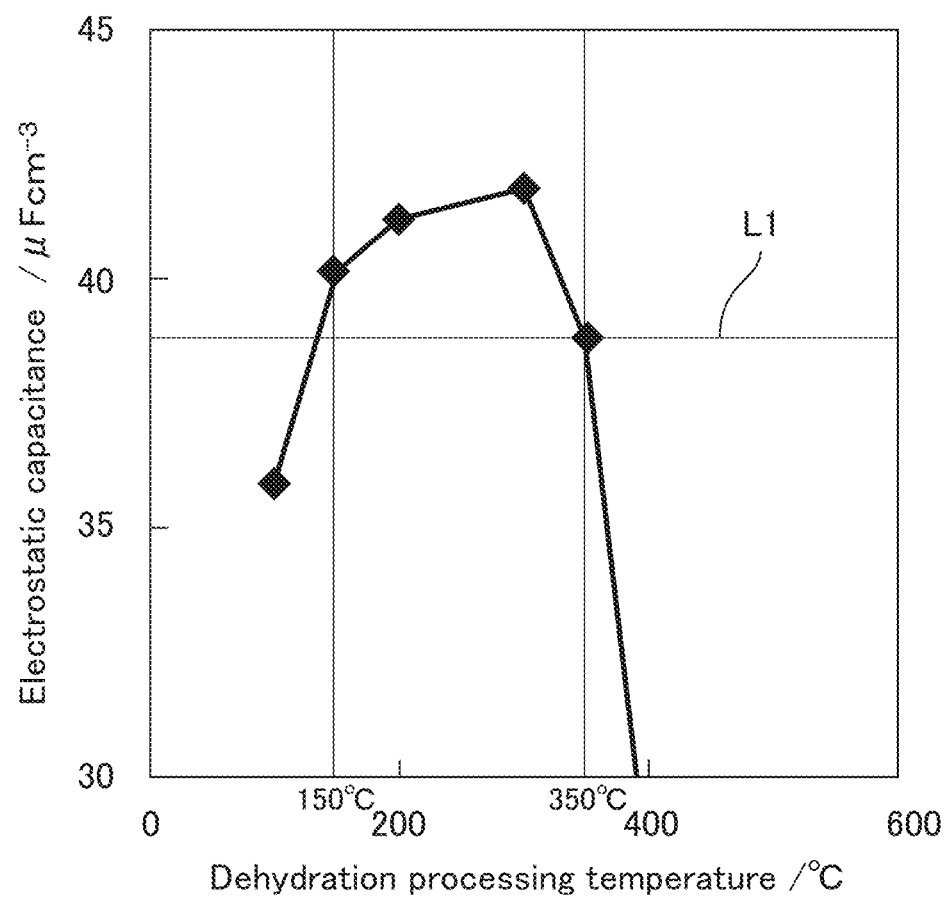
FIG. 8 is an explanatory view illustrating relationship between the temperature and the electrostatic capacitance of the dehydration step illustrated in FIG. 3.
Figure 9:
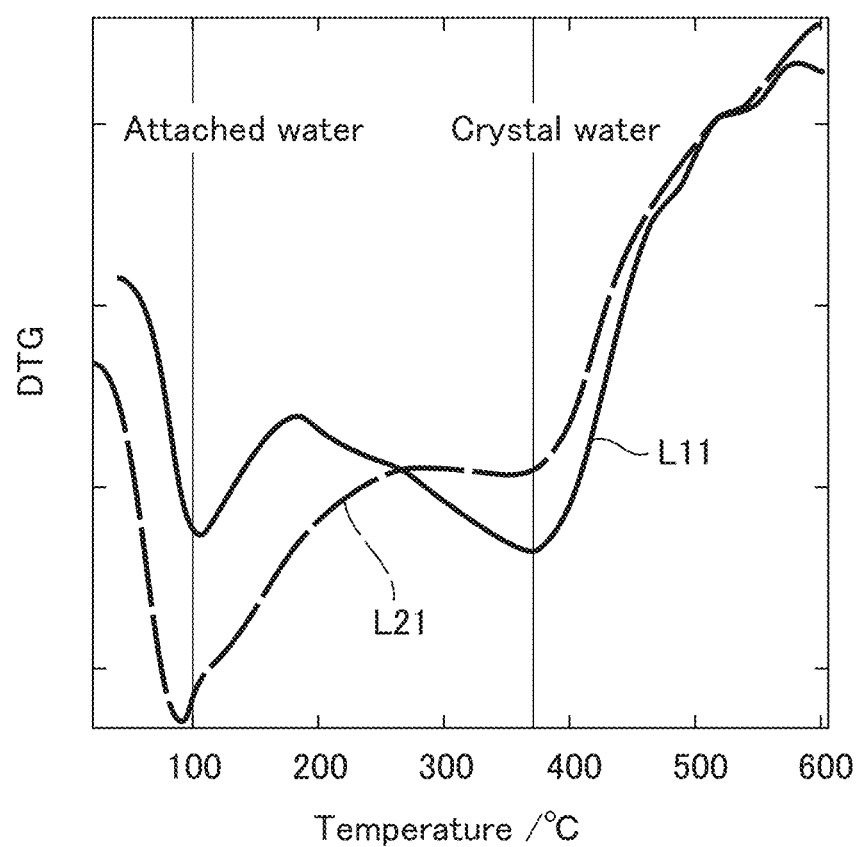
FIG. 9 is an explanatory view illustrating the result of the thermal analysis of a hydrated film.
Figure 10:
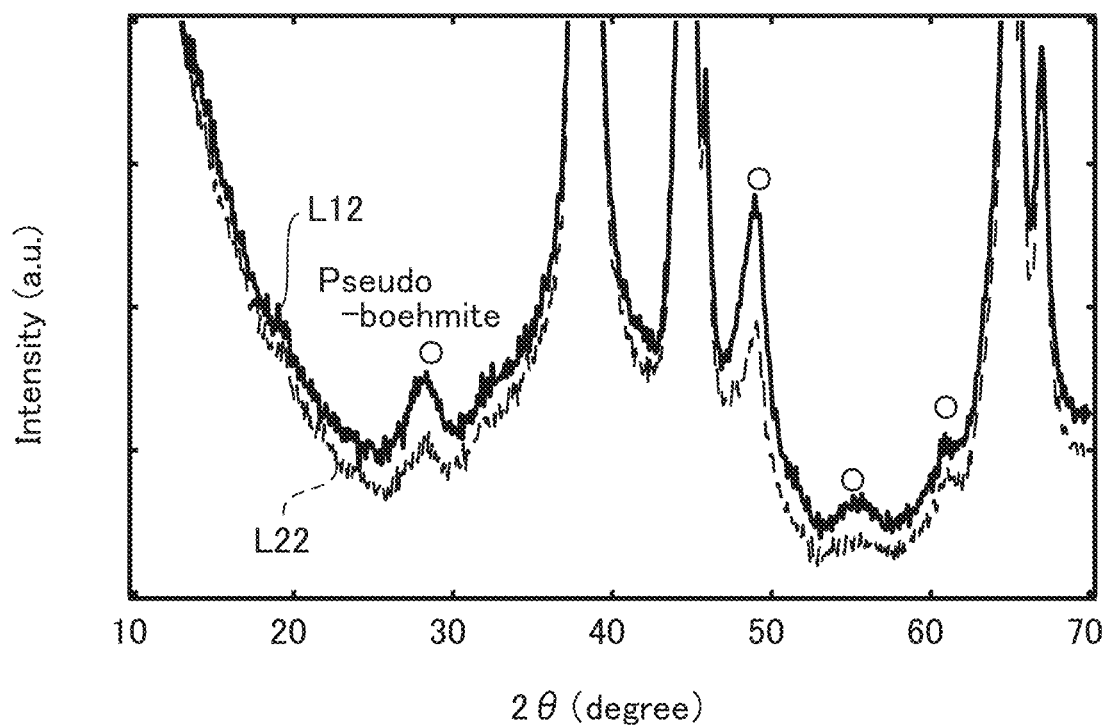
FIG. 10 is an explanatory view illustrating results of an XRD analysis of the hydrated film.
Figure 11A:
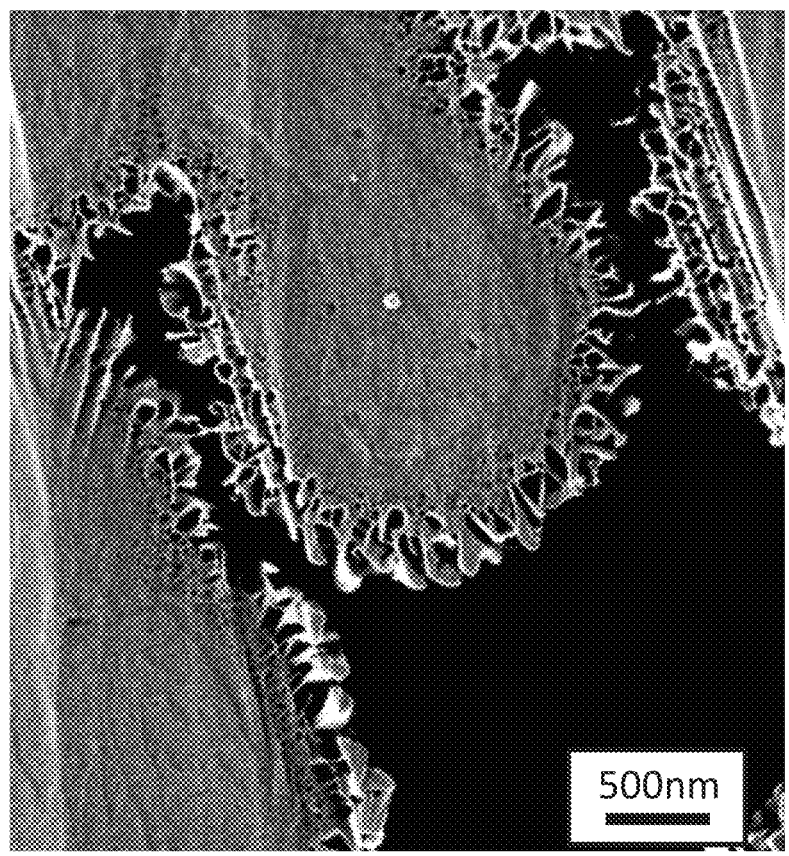
FIG. 11 includes explanatory views when hydrated films are observed with an electronic microscope.
Figure 11B:
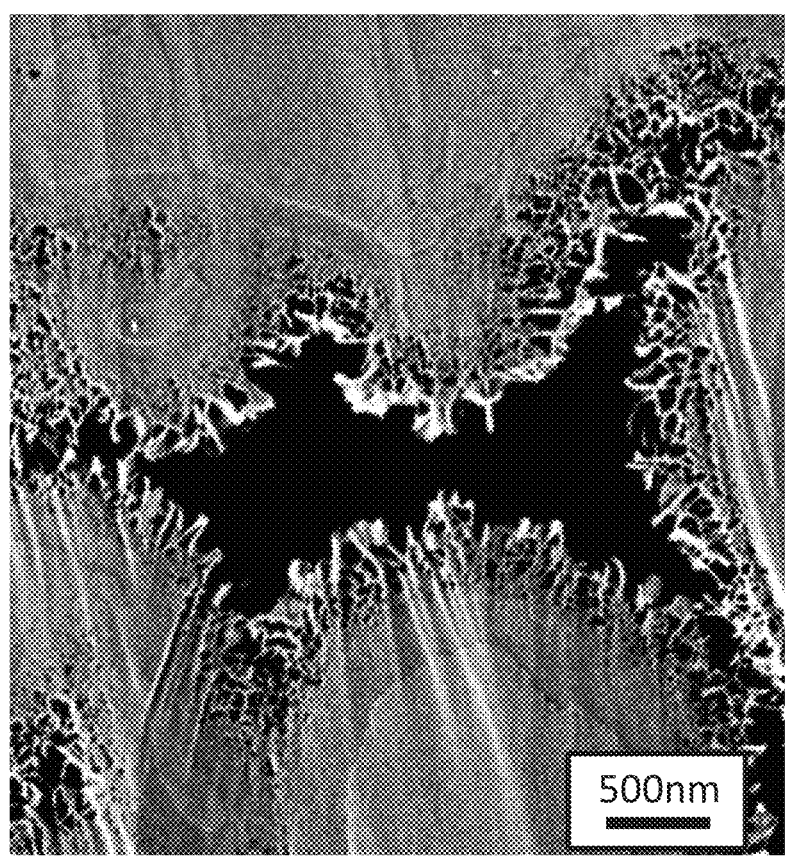

FIG. 8 is an explanatory view illustrating relationship between the temperature and the electrostatic capacitance of the dehydration step ST2 illustrated in FIG. 3. FIG. 9 is an explanatory view illustrating the result of the thermal analysis of the hydrated film. FIG. 10 is an explanatory view illustrating results of an XRD analysis of the hydrated film. "O" is assigned to peaks corresponding to crystalline pseudo-boehmite. FIG. 11 includes explanatory views when the hydrated films are observed with an electronic microscope. In analysis or the like illustrated in FIG. 8 to FIG. 11, a product prepared by forming the hydrated film in a thickness of 600 μm is used as the sample. In FIG. 9 and FIG. 10, the analysis results of the hydrated film formed by the method according to the present invention (including the dehydration step ST2) are illustrated as the solid lines L11 and L12, whereas the analysis results of the hydrated film formed by the conventional method (not including the dehydration step ST2) are illustrated as the dashed lines L21 and L22. The observation result of the hydrated film formed by the conventional method is illustrated in FIG. 11A, whereas the observation result of the hydrated film formed by the method according to the present invention is illustrated in FIG. 11B.

When the temperature in the dehydration step ST2 illustrated in FIG. 3 is changed, the electrostatic capacitance at the time of performing the chemical formation at 800 V changes as illustrated in FIG. 8. As can be seen from FIG. 8, when the temperature in the dehydration step ST2 is set to 150° C. or more and 350° C. or less, the electrostatic capacitance can be increased as compared with the case where conventional hydration treatment step (not including the dehydration step ST2) is performed.

As can be seen from FIG. 9 and FIG. 10, the reason of this change is probably because the large amount of highly crystalline pseudo-boehmite exists in the hydrated film formed by the method according to the present invention. In other words, according to the analysis results illustrated in FIG. 9, it is found that the hydrated film formed by the method according to the present invention contains a large amount of crystal water and according to the analysis results illustrated in FIG. 10, it is found that the hydrated film contains a large amount of highly crystalline pseudo-boehmite.

In the observation result illustrated in FIG. 11, it is found that clogging does not occur in the porous layer and cavities remain to the deep part of the pores according to the hydrated film formed by the method according to the present invention.

The dehydration step ST2 having a temperature of 100° C. or more and 370° C. or less provides pseudo-boehmite with higher crystallinity. However, based on the result illustrated in FIG. 8, the temperature in the dehydration step ST2 is set to 150° C. or more and 350° C. or less.

(Main Effects of the Present Embodiment)

As described above, in the method for producing the electrode for the aluminum electrolytic capacitor to which the present invention is applied, the dehydration step ST2 of heating the aluminum electrode in an atmosphere having a temperature of 150° C. or more and 350° C. or less is performed after the first hydration treatment step ST1 and thereafter the second hydration treatment step ST3 is performed. Consequently, the amount of highly crystalline pseudo-boehmite can be increased without forming a thick hydrated film and thus the crystallinity of the chemical formation film can be improved. Therefore, the electrostatic capacitance can be improved. In addition, the hydrated film is not required to be formed in a thick thickness and thus the clogging of the porous layer can be reduced. Therefore, deterioration in the hydration resistance of the chemical formation film due to the clogging and deterioration in the electrostatic capacitance due to the clogging can be reduced.

The application of the present invention is more effective in the case where the chemical formation of the aluminum electrode is performed at a chemical formation voltage of 400 V or more and further in the case where the chemical formation of the aluminum electrode is performed at a chemical formation voltage of 600 V or more in the chemical formation step ST10. In the case of high chemical formation voltage, the hydrated film is required to be formed in a thick thickness and thus the clogging of the porous layer tends to occur. Therefore, the application of the present invention is more effective in the case of a chemical formation voltage of 400 V or more and further 600 V or more. In addition, as the aluminum electrode, the porous aluminum electrode in which the porous layer made of the sintered layer of aluminum powder is laminated in a thickness of 200 μm to 50000 μm per layer onto the aluminum core material can provide high electrostatic capacitance compared with the case where an etched foil is used as the aluminum electrode even when the chemical formation voltage is 400 V or more. On the other hand, the surface of the porous layer has high reactivity with boiling pure water compared with the surface of the etched foil and thus the clogging at the surface tends to occur. Therefore, the application of the present invention is effective.

When the hydration inhibiting agent is blended in the first hydration treatment liquid and the second hydration treatment liquid, different from the pure water boiling in which the aluminum electrode is immersed into boiling pure water, the progressing rate of the hydration reaction can be adequately reduced. Therefore, the clogging in the porous layer due to an excessive hydrated film can be reduced. In addition, the generation rate of bubbles by the hydration reaction is slow and thus a state where the hydration reaction is difficult to be progressed in the deep part of the porous layer is less likely to occur.

Example

An aluminum electrode 10 (a porous aluminum electrode) in which the porous layer 30 was formed in a thickness listed in Table 1 by sintering the aluminum powder having an average particle diameter of 5 μm onto an aluminum foil (a core material) having a thickness of 30 μm, pure water heated to 90° C. (a first hydration treatment liquid and a second hydration treatment liquid), chemical formation liquids (a first chemical formation liquid and a second chemical formation liquid), and a phosphoric acid aqueous solution were prepared. The first chemical formation liquid was a 0.1 g/L ammonium adipate aqueous solution having a liquid temperature of 60° C. The second chemical formation liquid was an 80 g/L boric acid plus 0.1 g/L ammonium borate aqueous solution having a liquid temperature of 90° C. The phosphoric acid aqueous solution had a liquid temperature of 50° C. and a specific resistance measured at 50° C. of 0.2 Ωm.

Subsequently, under conditions listed in Table 1, the aluminum electrode 10 was subjected to the first hydration treatment step ST1, the dehydration step ST2, and second hydration treatment step ST3 and thereafter the chemical formation step ST10 was performed.

then the chemical formation was performed until the power supply voltage reached 800 V (chemical formation voltage) in the second chemical formation liquid. Subsequently, under the condition of a power supply voltage of 800 V, the aluminum electrode 10 was subjected to the constant voltage chemical formation in the second chemical formation liquid for 180 minutes in the constant voltage chemical formation step ST12. During this period, two times of the heat treatment and two times of the phosphoric acid immersion were performed. Out of Example 1 to Example 5, in Example 2, the heat press step illustrated with reference to FIG. 5, FIG. 6, and FIG. 7 was performed at the time of the dehydration step ST2 and the thermal depolarization treatment ST32.

With respect to the aluminum electrode produced by such conditions, film withstand voltage, electrostatic capacitance per unit volume, and hydration resistance were measured. The results are listed in Table 2. The film withstand voltage, the electrostatic capacitance per unit volume, and the leakage current per unit volume were measured in accordance with JEITA standard. The hydration resistance test was

|  | Thickness of laminated layer made of powder per one side FIG. in parentheses represents total thickness of laminated | Time for first hydration treatment step ST1 | Temperature and time for dehydration step ST2 | Time for second hydration treatment step ST3 |
|---|---|---|---|---|
| Comparative Example 1 | 200 μm (400 μm) | 10 minutes | — | — |
| Comparative Example 2 | 200 μm (400 μm) | 20 minutes | — | — |
| Comparative Example 1 | 200 μm (400 μm) | 10 minutes | 5 minutes at 90° C. | 2 minutes |
| Example 1 | 200 μm (400 μm) | 4 minutes | 4 minutes at 250° C. | 2 minutes |
| Example 2 | 200 μm (400 μm) | 4 minutes | 3 minutes at 300° C. | 2 minutes |
| Example 3 | 400 μm (800 μm) | 5 minutes | 3 minutes at 300° C. | 3 minutes |
| Example 4 | 1000 μm (2000 μm) | 8 minutes | 3 minutes at 300° C. | 5 minutes |
| Example 5 | 400 μm (400 μm) Sinter the aluminum powder only on one side | 5 minutes | 5 minutes at 200° C. | 3 minutes |

In the chemical formation step ST10, first, the chemical formation was performed until the power supply voltage reached 200 V in the first chemical formation liquid in the constant current chemical formation step ST11. Thereafter, the aluminum electrode 10 was washed with water and the aluminum electrode 10 was immersed into the phosphoric acid aqueous solution for 5 minutes in the phosphoric acid immersion step ST21. Subsequently, the aluminum electrode 10 was washed with water. Subsequently, the chemical formation is performed until the power supply voltage reached 450 V in the first chemical formation liquid in the constant current chemical formation step ST11. Thereafter, the aluminum electrode 10 was washed with water and the aluminum electrode 10 was immersed into the phosphoric acid aqueous solution for 5 minutes in the phosphoric acid immersion step ST21. Subsequently, the aluminum electrode 10 was washed with water. Subsequently, the chemical formation was performed until the power supply voltage reached 600 V in the first chemical formation liquid. Thereafter, the aluminum electrode 10 was washed with water and conducted in accordance with JEITA standard and the measurement was carried out at a current density of 40 mA/cm$^3$.

TABLE 2

| Remarks | Film withstand voltage (V) | Electrostatic capacitance (μF/cm$^3$) | Hydration resistance (s) |
|---|---|---|---|
| Comparative Example 1 | 829 | 39 | 15 |
| Comparative Example 2 | 835 | 41 | 210 |
| Comparative Example 3 | 831 | 38 | 17 |
| Example 1 | 830 | 41 | 9 |
| Example 2 | 832 | 41 | 11 |
| Example 3 | 825 | 41 | 12 |
| Example 4 | 805 | 41 | 15 |
| Example 5 | 820 | 41 | 14 |

In Comparative Example 1, the electrostatic capacitance is insufficient because of the case where a usual hydration treatment step (pure water boiling alone) was performed as preprocessing. In Comparative Example 2, the usual hydration treatment step (pure water boiling alone) was performed and the boiling time was longer than that of Comparative Example 2. Consequently, clogging was generated in the porous part of the aluminum electrode. Therefore, the electrostatic capacitance is low and the hydration resistance worsens.

In Comparative Example 3, the dehydration step ST2 and the second hydration treatment step ST3 were performed after the first hydration treatment step ST1. The temperature in the dehydration step ST2 was low. This causes insufficient crystallization of pseudo-boehmite and thus a sufficient effect is not obtained.

In any one of Example 1, Example 2, Example 3, Example 4, and Example 5, the dehydration step ST2 and the second hydration treatment step ST3 were performed after the first hydration treatment step ST1 and the temperature in the dehydration step ST2 was in the range of 150° C. or more and 350° C. or less. Therefore, the electrostatic capacitance is high and the hydration resistance is excellent. In Example 2, the heat press step was performed at the time of the dehydration step ST2 and thus smoothness of the aluminum electrode 10 is excellent.

Other Embodiments

In the above embodiment, the case where the porous aluminum electrode formed by laminating the porous layer made of the sintered layer of aluminum powder onto the aluminum core material is used is exemplified. However, the present invention may be applicable in the case where an etched foil is used as the aluminum electrode.

The invention claimed is:

1. A method for producing an electrode for an aluminum electrolytic capacitor, the method comprising:
   a first hydration treatment step of forming a hydrated film onto an aluminum electrode including a porous layer by immersing the aluminum electrode into a first hydration treatment liquid whose temperature is 80° C. or more and a boiling point thereof or less;
   a dehydration step of heating the aluminum electrode in an atmosphere having a temperature of 150° C. or more and 350° C. or less after the first hydration treatment step;
   a second hydration treatment step of immersing the aluminum electrode into a second hydration treatment liquid whose temperature is 80° C. or more and a boiling point thereof or less after the dehydration step; and
   a chemical formation step of performing chemical formation of the aluminum electrode in which a voltage of 400 V is applied to the aluminum electrode in chemical formation liquid, after the second hydration treatment step,
   wherein the first hydration treatment liquid and the second hydration treatment liquid have a pH of 5.0 or more and 9.0 or less, and
   at least one hydration treatment liquid out of the first hydration treatment liquid and the second hydration treatment liquid is made by blending a hydration inhibiting agent into water.

2. The method for producing the electrode for the aluminum electrolytic capacitor according to claim 1, wherein the chemical formation of the aluminum electrode is performed at a chemical formation voltage of 400 V or more and 800 V or less in the chemical formation step.

3. The method for producing the electrode for the aluminum electrolytic capacitor according to claim 2, wherein the chemical formation of the aluminum electrode is performed at a chemical formation voltage of 600 V or more and 800 V or less in the chemical formation step.

4. The method for producing the electrode for the aluminum electrolytic capacitor according to claim 1, wherein the aluminum electrode is a porous aluminum electrode formed by laminating a porous layers made of sintered layers of aluminum powder and having a thickness of 200 μm or more and 50000 μm or less per layer onto a core material.

5. The method for producing the electrode for the aluminum electrolytic capacitor according to claim 1, wherein the hydration inhibiting agent is a sugar or a sugar alcohol, and wherein the sugar or sugar alcohol is any one of ribulose, xylulose, ribose, arabinose, xylose, lyxose, deoxyribose, psicose, fructose, sorbose, tagatose, allose, altrose, glucose, mannose, gulose, idose, galactose, talose, fucose, fuculose, rhamnose, sedoheptulose, mannitol, sorbitol, xylitol, sucrose, lactulose, lactose, maltose, trehalose, cellobiose, lactitol, maltitol, nigerose, raffinose, maltotriose, melezitose, stachyose, acarbose, and amylose.

6. The method for producing the electrode for the aluminum electrolytic capacitor according to claim 1, wherein the hydration inhibiting agent is an organic acid or a salt thereof, and the organic acid is any one of dodecanoic acid, benzoic acid, propanedioic acid, butanedioic acid, (E)-2-butenedioic acid, pentanedioic acid, hexanedioic acid, decanedioic acid, dodecanedioic acid, 2-hydroxypropane-1,2,3-tricarboxylic acid, and (E)-1-propene-1,2,3-tricarboxylic acid.

7. The method for producing the electrode for the aluminum electrolytic capacitor according to claim 1, wherein, in the dehydration step, the aluminum electrode is heated while pressed by first members in a thickness direction of the aluminum electrode.

8. The method for producing the electrode for the aluminum electrolytic capacitor according to claim 7, wherein the first members are heated at a temperature of 150° C. or more and 350° C. or less at the time of performing the dehydration step.

9. The method for producing the electrode for the aluminum electrolytic capacitor according to claim 1, wherein, in the chemical formation step, a plurality of times of a chemical formation treatment are performed, and
   between any of the times of the chemical formation treatment, a heat press step of heating the aluminum electrode while pressing by second members in a thickness direction of the aluminum electrode is performed.

10. The method for producing the electrode for the aluminum electrolytic capacitor according to claim 9, wherein the second members are heated at a temperature of 350° C. or more and 600° C. or less at the time of performing the heat press step.

* * * * *